Patented Apr. 22, 1947

2,419,341

UNITED STATES PATENT OFFICE 2,419,341

DISSOLVING CELLULOSE

Sidney M. Edelstein, Elizabeth, N. J.

No Drawing. Application December 13, 1943,
Serial No. 514,144

5 Claims. (Cl. 260—212)

This invention relates to the method of making solutions of cellulosic material. It relates, particularly, to dissolving cellulose in aqueous solutions of an alkali metal zincate or hydroxide.

The application is a continuation in part of my copending application Ser. No. 483,817 filed April 20, 1943, by me and entitled Solubilized cellulose and method of making, which has now been issued as Patent 2,357,731, which in turn contains subject matter derived from my application Serial No. 407,445 filed August 19, 1941, which has now been issued as Patent 2,322,427.

This copending application describes the dissolving of the cellulose in sodium zincate solution under special conditions.

I have now discovered that when cellulose fiber of a certain maximum length is used, the dissolving of cellulose in zincate is promoted, the cellulose is soluble in sodium hydroxide solutions under a wider range of conditions than otherwise, and the resulting solutions are free from objectionable quick gelling which is characteristic of those made under otherwise comparable conditions from fibers of longer length.

The invention comprises the method of and the product resulting from treating cellulose fibers of mean length not substantially above 200 microns and preferably of mean length not above 140 microns with a solution of an alkali metal hydroxide or an alkali metal zincate containing an excess of alkali metal hydroxide, the solution of the short fiber cellulose being effected either by cooling the cellulose in contact with the hydroxide or zincate solution to a low temperature, say of 0° to —10° C., or by contacting the cellulose with a relatively concentrated solution of the hydroxide or zincate and then diluting with water at temperatures that may be considerably above the said low temperature.

Unless otherwise specifically recited herein, the composition of the zincate solution and all conditions used in dissolving the cellulose fibers in zincate solution may be and preferably are those described in the said copending application or in my Patent No. 2,322,427 issued June 22, 1943, for Cellulose product, only the size of the fibers being different.

When the alkali metal hydroxide solution is used in place of the zincate and the sodium hydroxide is to be diluted subsequent to contacting of the solution with the cellulose, the same general conditions are used for effecting the solution. The hydroxide solution is used suitably at an initial concentration of about 15 to 50 parts and preferably 16 to 30 parts of sodium hydroxide for 100 parts of water. When the sodium hydroxide used initially is not to be diluted substantially, the concentration used should be about 8 to 12 and preferably 8 to 10 parts of the alkali for 100 parts of water. The use of such a solution without dilution requires a low temperature to dissolve the cellulose, say temperatures from plus 5° to 0° C. down to the temperature at which an inorganic component of the solution begins to crystallize, as by freezing of water present. In case there is used initially the relatively strong solution of sodium hydroxide followed by dilution, the proportion of water used in effecting the dilution is such as to lower the concentration in the final solution to 6 to 12 and preferably 8 to 10 parts of sodium hydroxide for 100 parts of water.

I have now found that a great improvement is made when the cellulose which is used has been previously finely comminuted, as by cutting or otherwise forming the fibers into short lengths and exposing parts of the fiber that were initially in the interior thereof. Such comminuted fibers dissolve readily in either the zincate or hydroxide solution under the conditions stated, with the production of practically clear, stable solutions. With the shorter lengths of fibers, there is not only increased speed of solution in the alkali metal zincate or hydroxide solution, but also the final solutions of the short fibers have less tendency to gel upon standing after the solution is once effected.

Cut rayon yarn, for example, of mean fiber length of approximately 200 microns, dissolves at a satisfactory speed to give a solution that does not gel over a considerable period after the solution is formed. Another rayon product cut to a mean fiber length less than 140 microns dissolves rapidly in zincate or hydroxide under the conditions described above and gives a solution that remains clear for many days. Wood pulp or other cellulose that has been cut to 120 microns or less in mean length of fiber dissolves still more rapidly and gives a satisfactorily clear solution that does not gel within several weeks.

There is no lower limit to the fineness to which the cellulose may be cut for use in accordance with the present invention. Any fiber, from the shortest length that it is practicable to manufacture, up to a mean fiber length not substantially above 200 microns is satisfactory. The shorter lengths within this range are preferred. They dissolve faster and give better stability of the finished solution.

Any convenient means of comminuting that is usual in finely subdividing materials similar to cellulose may be used as, for example, cutting, grinding, or shredding equipment. Thus, there may be used a floccing machine which is standard in the textile industry or a shearing machine for velvets or the like set to cut the desired length of fiber from a velvet. Trimming from a rayon velvet may be used.

Although sodium hydroxide is ordinarily the alkali used in making the alkali metal hydroxide solution or with zinc oxide in making the alkali metal zincate solution, potassium hydroxide may be substituted mol for mol for the sodium hydroxide. Sodium hydroxide is preferred, however, as the alkali to be used. Sodium zincate with excess of the hydroxide and sodium hydroxide dissolve the comminuted cellulose satisfactorily and the sodium compounds are available or producible at a satisfactory cost.

As the source of cellulose there is used to advantage a cellulosic material such as cotton, cotton linters, wood fibers, wood pulp of which sulfite pulp is a good example, scrap rayon, or a cellulose ether of which methyl, ethyl, and hydroxyethyl cellulose are examples of suitable material. These ethers are known to be alkali stable. Non-cellulosic matter that may be present in the raw material selected and that remains undissolved in my treatment may be separated by filtration or sedimentation after the solution is made. In any case it is required that the selected cellulose before contacting with the solution to dissolve the cellulose must be comminuted to fiber size described above.

In the preferred order of mixing, the comminuted cellulose is suspended initially in a part or all of the water to be used in making the final solution. To the slurry, there is then added the selected amount of sodium hydroxide either in the form of a very concentrated solution or in dry form. When subsequent dilution is to be effected, the amount of alkali added is that required to make the concentration of the sodium hydroxide, after dissolving, equal to or above the salting out concentration, that is, the concentration adequate to cause precipitation of cellulose previously dissolved, say, in sodium zincate or hydroxide, such a concentration being about 15 to 50 parts of the sodium hydroxide for 100 parts of water. Particularly satisfactory results are obtained when sodium hydroxide is added to establish the concentration of its solution at this stage at about 16 to 30%.

The mixture of the strong sodium hydroxide solution and comminuted cellulose so made is allowed to stand for a sufficient time for the solution to penetrate the cellulose thoroughly. Then there is introduced water in such amount as to make the final concentration of the sodium hydroxide solution less than that which salts out the cellulose (as from a previously prepared solution) but at least equal to the minimum concentration required to retain in solution cellulose that has been dissolved in sodium hydroxide. Thus, the dilution is made with such a proportion of water that the final concentration of sodium hydroxide is approximately 8 to 12 parts for 100 parts of water and preferably is within the range of 8 to 10 parts.

While the dilution may be made and the added water stirred in uniformly in any convenient manner, equally satisfactory results are obtained when the dilution is made gradually over the course of at least a few minutes, as by adding the water in small portions or continuously while the whole mixture is being stirred.

In another embodiment, the dilution of the relatively concentrated zincate or sodium hydroxide solution first used is effected by means of melting ice, so that the ice serves to supply water at a more or less regular rate as the ice melts. In this case the amount of ice used is such that, when all is melted or when the unmelted portion of the ice is separated by draining off the liquid while holding back the ice, the sodium hydroxide will have been diluted to the final concentration within the range recited above.

Solutions of the comminuted fibers in zincate are made to advantage as described in my said patent and copending application, the comminuted cellulose being substituted pound for pound for the cellulose described in the said patent and application.

Particularly rapid rates of solution are obtained when cellulose is not only comminuted but also of reduced viscosity. Thus, there is used to advantage cellulose fiber of the kind described that has been reduced substantially in viscosity, say to about three-fourths to one-tenth or somewhat less of the original, as by any conventional viscosity lowering treatment.

The finely divided fibers when treated as described above disperse quickly in the solution of sodium zincate or hydroxide, the treatment followed by dilution giving satisfactory results even at ordinary temperatures. The solution occurs so rapidly that there is no substantial difficulty of objectionably long contact with the sodium zincate or hydroxide such as, if required along with low temperatures to effect solution in the first place, would cause gelatinization of cellulose first dissolved before the last of the cellulose is dissolved.

After all the cellulose or cellulose derivative used is dissolved, as shown by the formation of a clear or nearly clear liquid mass, the solution is warmed promptly to about 15° to 25° C. (unless already that warm), so as to stabilize the solution and minimize subsequent gelation.

With cellulose fibers that have been cut to length stated above and then treated to reduce the viscosity by at least a third or more, sodium hydroxide gives solution in about 10 to 20 minutes or less, when the hydroxide at high concentration is contacted with the fibers and is subsequently diluted as described. Zincate solutions are formed in an equal or shorter period.

The invention will be further illustrated by description in connection with the following specific examples.

*Example 1*

A low viscosity cellulose is made by cutting wood pulp in a floccing machine, to fibers of mean length 137 microns, and heating the comminuted wood pulp for 12 hours at 125° C. Ten parts of this cellulose are treated with 20 parts of 40% sodium hydroxide solution. This treatment is accomplished by soaking the cellulose in a large volume of the caustic at room temperature, such as 10° to 30° C., and then pressing so that each pound of cellulose retains 2 parts of the hydroxide solution. This pressed material is shredded and kneaded for one hour and then 70 parts of water, also at about room temperature or about 10° to 30° C., are added to make approximately 100 pounds of solution. This results in a clear cellulose solution.

*Example 2*

A cellulose ether, such as cellulose hydroxyethyl ether or methyl or ethyl cellulose of mean fiber length less than 200 microns is used. Eight parts of the ether are treated with 20 pounds of 42% solution of sodium hydroxide in water for 2 hours at 20° C. Then 72 pounds of water at about the same temperature is added to make 100 pounds of solution.

*Example 3*

Sulfite wood pulp is ground in any usual manner, as by ball milling a slurry of the pulp in water, until the ground pulp can be slurried with four parts of water to one of the pulp.

The comminuted pulp is then treated with about 5 to 10 times its weight of a 0.05% solution of hydrogen peroxide in water in an iron vessel, at a temperature of 95° to 100° C., for an hour or so, to lower the viscosity to approximately a sixth of the original viscosity of the cellulose, the viscosity being measured by dissolving samples of the untreated and treated cellulose in cuprammonium solution and determining the relative fluidities of the two solutions.

This short fiber cellulose of reduced viscosity is made into a slurry in the proportion of 10 parts of the cellulose to 100 parts of water. To this slurry there is then added 25 parts of commercial flake sodium hydroxide. The whole is stirred as the sodium hydroxide is being added and for some time thereafter, so as to make certain that there is thorough contact of the cellulose with the uniformly concentrated solution of sodium hydroxide and that the solution penetrates the cellulose.

After about 15 minutes contact of the hydroxide solution with the fibers, there are introduced 150 parts of cracked ice. The whole is then stirred, the ice melting gradually and serving to dilute and cool the mixture.

This example may be varied, as in the amount of ice used. Thus, the amount of ice used may be so selected as to cause the temperature of the mixture after melting of the ice to be between 0 and −15° C., say about −2° to −8° C. Such low temperatures are favorable to the rapid solution of the cellulose that has been contacted with the concentrated sodium hydroxide solution, upon dilution of the latter, but such temperatures are not required for a satisfactory rate of making such solution.

*Example 4*

The procedure of Example 1 is followed except that the water of dilution is added in a small stream over a period of about five minutes so that dilution of the concentrated sodium hydroxide is effected gradually.

*Example 5*

The procedure of any of the above examples is followed except that there is substituted cut rayon or Cellophane waste or one of the cellulose ethers referred to above, the substitution being made on the basis of 1 part of the substituted material for 1 part of the cellulose.

*Example 6*

The procedure of Examples 1 to 5 is followed except that there is substituted, for the sodium hydroxide solution used initially, a solution made from 18 parts of sodium hydroxide, 6 parts of zinc oxide and 76 parts of water. Suitably the zincate solution is used in the proportion of 6 to 10 pounds for 1 pound of the comminuted cellulose, the cellulose is pre-slurried with water, and the whole mixture after contact of the zincate solution with the cellulose is diluted as described to a final concentration of titratable alkalinity calculated as sodium hydroxide of about 8 to 12 per cent.

To stabilize the solutions made in accordance with any of the above examples, the solutions are preferably warmed promptly after being made, to a temperature of about 15° to 50° C. provided the solutions have been made initially at lower temperatures.

Solutions made as described herein are practically clear.

The cellulose present is precipitated by various precipitating agents as by the addition of sulfuric or other acid, to neutralize the sodium hydroxide in the dissolving media, or by the addition of soluble salts in high concentrations.

My solution when precipitated gives strong masses of regenerated cellulose at a cost which is very favorable as compared to other methods of dissolving and regenerating cellulose in the form of sheets, threads, or cellulose coating film, for the making of which articles my solution is useful.

It will be understood also that it is intended to cover all changes and modifications of the examples of the invention herein chosen for the purpose of illustration which do not constitute departures from the spirit and scope of the invention.

What I claim is:

1. In making a solution of cellulose, the method which comprises treating cellulose of mean fiber length not substantially above 200 microns with a solution of an alkali metal hydroxide containing dissolved alkali metal zincate.

2. In making a solution of a cellulosic material, the method which comprises treating a cellulosic material consisting essentially of material selected from the group consisting of cellulose and alkali stable cellulose ethers and having a mean fiber length not substantially above 200 microns with a solution of an alkali metal hydroxide at a concentration at least equal to the salting out concentration for dissolved cellulose and then diluting the sodium hydroxide to a concentration not substantially above 12 per cent.

3. In making a solution of a cellulosic material, the method which comprises treating a cellulosic material consisting essentially of material selected from the group consisting of cellulose and alkali stable cellulose ethers and having a mean fiber length not substantially above 200 microns with a solution of an alkali metal hydroxide at a concentration at least equal to the salting out concentration for dissolved cellulose and then cooling and diluting the sodium hydroxide to a concentration not substantially above 12 per cent, at a temperature below 5° C. but above the freezing point of any inorganic material present, the alkali metal hydroxide solution used being substantially free from zincate.

4. The method described in claim 1, the cellulosic material being cellulose, the mean fiber length being less than 140 microns, and the alkali metal hydroxide solution used being substantially free from zincate.

5. In making a solution of cellulose the method which comprises treating cellulose of mean fiber length not substantially above 200 microns and in contact with water if any in amount less than that required to form a slurry of the cellulose with a solution of an alkali metal hydroxide containing dissolved alkali metal zincate, the alkali metal hydroxide being in proportion in excess of that required to convert the zinc present to zincate.

SIDNEY M. EDELSTEIN.

REFERENCES CITED

The following references are of record in the file of this patent:

UNITED STATES PATENTS

| Number | Name | Date |
|---|---|---|
| 2,331,865 | Swinehart et al. | Oct. 12, 1943 |
| 1,960,551 | Richter | May 29, 1934 |
| 1,839,411 | Richter | Jan. 5, 1932 |
| 2,322,427 | Edelstein | June 22, 1943 |

FOREIGN PATENTS

| Number | Country | Date |
|---|---|---|
| 403,783 | German | Oct. 4, 1924 |